Patented May 7, 1935

2,000,371

UNITED STATES PATENT OFFICE 2,000,371

CEMENT PLASTER

Fred Bauer, Redlands, Calif.

No Drawing. Application May 20, 1933,
Serial No. 672,043

2 Claims. (Cl. 106—24)

The object of my invention is the production of a cement plaster composition which may be used as a plaster or coating for interior walls and ceilings of buildings, also for exterior or stucco coating for buildings, a plaster which may be used for the same purposes as and as a substitute for Keene's cement and which is capable of being troweled or finished more smoothly and with less labor than Keene's cement.

My composition consists of a mixture of white limestone sand, hydrated lime, Keene's cement or other hard white cement, and dried cactus plant in pulverized form.

In preparing the composition, I prefer to use the ingredients in about the following proportions, to-wit:

(1) Fifty-eight (58) pounds of white limestone rock sand, graded as follows:

100% or 58 pounds to pass through a screen of 50 mesh to the square inch, with 58.6% or 34 pounds to be retained on a screen of 80 mesh to the square inch.

(2) Fifteen (15) pounds of hydrated lime.

(3) Twenty-seven (27) pounds of Keene's cement.

(4) Six (6) ounces of dried pulverized desert cactus (a plant of the family Cactaceae; order opuntiales).

These ingredients are thoroughly mixed, preferably in a mechanical mixer, then sacked ready for use. When used, it is mixed with a quantity of water sufficient to render it of the desired consistency for plastering or molding. The purpose and effect of the pulverized cactus is to cause a better cohesion between the particles of the plaster resulting in less labor in application to the wall or ceiling and in easier troweling.

If the composition is to be used for exterior or stucco work, fifteen (15) pounds of white Portland cement should be used instead of the twenty-seven (27) pounds of Keene's cement.

This plaster has the following advantages, to-wit:

It can be used for any purpose for which Keene's cement may be used and can be troweled more easily and smoother than Keene's cement. It is also more economical than Keene's cement.

My plaster does not chip-crack or fire-check and retains a fine gloss after being troweled and is much harder than Keene's cement work or other ordinary white coating work.

I claim:

1. A plaster which comprises the following ingredients in substantially the following proportions: fifty-eight pounds of white limestone rock sand, fifteen pounds of hydrated lime, twenty-seven pounds of Keene's cement, and six ounces of dried cactus plant in powdered form.

2. A plaster which comprises white limestone rock sand, hydrated lime, a cement selected from the group consisting of Keene's cement and Portland cement, and a small quantity of dried cactus plant in powdered form.

FRED BAUER.